(12) United States Patent
Xu (10) Patent No.: US 11,288,315 B2
(45) Date of Patent: *Mar. 29, 2022

(54) REDIRECTING GRAPH QUERIES (71) Applicant: GraphSQL, Inc., Redwood City, CA (US)

(72) Inventor: Yu Xu, Millbrae, CA (US)

(73) Assignee: GraphSQL, Inc., Mountain View, CA (US)

(*) Notice: Subject to any disclaimer, the term of this patent is extended or adjusted under 35 U.S.C. 154(b) by 437 days.

This patent is subject to a terminal disclaimer.

(21) Appl. No.: 15/965,067

(22) Filed: Apr. 27, 2018

(65) Prior Publication Data

US 2018/0246989 A1 Aug. 30, 2018

Related U.S. Application Data (63) Continuation of application No. 14/486,319, filed on Sep. 15, 2014, now Pat. No. 9,977,837.

(60) Provisional application No. 61/878,261, filed on Sep. 16, 2013.

(51) Int. Cl.
*G06F 16/90* (2019.01)
*G06F 16/901* (2019.01)
*G06F 16/2458* (2019.01)

(52) U.S. Cl.
CPC ...... *G06F 16/9024* (2019.01); *G06F 16/2458* (2019.01)

(58) Field of Classification Search
CPC ......... G06F 17/30958; G06F 17/30528; G06F 17/30533; G06F 17/30595; G06F 16/9024; G06F 16/2458
See application file for complete search history.

(56) References Cited

U.S. PATENT DOCUMENTS

| | | | |
|---|---|---|---|
| 2009/0113288 A1 | 4/2009 | Thampy et al. | |
| 2011/0035403 A1* | 2/2011 | Ismalon | G06F 16/242 707/769 |
| 2013/0018900 A1* | 1/2013 | Cheng | G06F 7/00 707/755 |
| 2013/0080395 A1* | 3/2013 | Gong | G06F 16/21 707/661 |
| 2013/0191759 A1* | 7/2013 | Bhogal | G06F 16/00 715/752 |
| 2013/0326620 A1* | 12/2013 | Merza | H04L 63/1408 726/22 |
| 2014/0156633 A1 | 6/2014 | Duan et al. | |

* cited by examiner

*Primary Examiner* — Truong V Vo (57) ABSTRACT

Disclosed herein are systems, methods, and software for redirecting relational data queries to previously generated graphs. In one example, a method of operating a graph redirect system includes identifying a relational data query and identifying whether at least one previously generated graph in a group of one or more previously generated graphs relates to the relational data query based on similarity data. The method further provides, in response to identifying that at least one previously generated graph relates to the relational data query, directing the relational data query to the at least one previously generated graph, and responding to the relational data query using the at least one previously generated graph.

20 Claims, 5 Drawing Sheets

REDIRECTING GRAPH QUERIES

RELATED APPLICATIONS

This application is related to and claims priority to U.S. patent application Ser. No. 14/486,319, entitled "REDIRECTING GRAPH QUERIES," filed on Sep. 15, 2014, which itself clams priority to U.S. Provisional Patent Application No. 61/878,261, entitled "REDIRECTING GRAPH QUERIES," filed on Sep. 16, 2013, and which is hereby incorporated by reference in its entirety.

TECHNICAL BACKGROUND

A relational database system is a collection of data items organized as a set of formally described tables from which data can be accessed. These relational databases can become enormous, and the response to any query of these databases may require accessing a multitude of tables, each of which may be partially responsive to the query.

Many relational databases, such as in social networks, grow rapidly as data changes with respect to participants and their various natures, features, qualities, and the like. Such a network may be represented by a graph, where nodes are connected by edges to other nodes, and both the nodes and edges represent associated relational data. Thus, using a social network as an example, the nodes of the graph may represent members of the social network, while the edges represent the associations between each of the various members.

Previously, the updating and searching of these graphs has been laborious, time consuming, and inordinately and exhaustively detailed, requiring the individual treatment and assessment of each of a multiplicity of nodes and edges. Further, a graph may have to be updated each time the tables are revised requiring resources and time that may have been better suited elsewhere.

In some instances, graph analytics may be accomplished using one or more computing devices to organize and graph relational data. These computing devices may include server computers, desktop computers, laptop computers, or other similar computing devices. To perform graph analytics, graph analytics systems may first organize data items into formally described tables in what is known as the relational database, wherein the data items may include transaction data, friendship data, and purchase data, among other data—including combinations thereof. Following the input of the data items, a query may be generated to determine relationships or facts about data items. To help in answering these queries, it is often useful to generate a graph view of the relational data. This graph view includes nodes and edges that are both easier to illustrate associations in the data, as well as faster to traverse and respond to inquiries. However, to answer the queries, a graph must first be generated that corresponds to the appropriate data, which takes time and resources.

OVERVIEW

Examples disclosed herein provide systems, methods, and software for redirecting relational data queries to previously created graphs. In one example, a method of operating a graph redirect system includes identifying a relational data query and identifying if at least one previously generated graph in a group of one or more previously generated graphs relates to the relational data query based on similarity data. The method further provides, if at least one previously generated graph relates to the relational data query, directing the relational data query to the at least one previously generated graph, and responding to the relational data query using the at least one previously generated graph.

In another example, a computer apparatus to redirect graph queries includes processing instructions that direct a computing system to identify a relational data query and identify if at least one previously generated graph in a group of one or more previously generated graphs relates to the relational data query based on similarity data. The processing instructions further direct the computing system to, if at least one previously generated graph relates to the relational data query, direct the relational data query to the at least one previously generated graph, and respond to the relational data query using the at least previously generated graph.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Graph analytics may be accomplished using one or more computing devices to organize and graph relational data from relational databases. Relational databases organize data objects into one or more formally described tables, wherein the data objects include transaction data, friendship data, and purchase data, amongst other data—including combinations thereof. From the relational databases, graphs may be generated to more easily illustrate and traverse the data captured in the tables. Once graphed, relational queries can be applied to the graphs to determine a response to the query.

To assist in answering relational queries, it may be faster and more efficient for a graphing environment to refer to previously generated graphs to answer queries as opposed to generating a new graph for each query. For example, if a user wanted to determine the degrees of separation between a first user of a social network and a second user of a social network, it may be faster to analyze a graph that was previously generated for the social network to determine the query response. In some examples, previously generated graphs may be assigned a relationship value that is used to relate the current relational query to a previous graph. Accordingly, if the relationship value for a previous graph meets a certain criteria for the new query, the previous graph may be used to respond to the query rather than generating a new graph.

In some examples, the relationship value and criteria may be based on the number of similar nodes and edges from the time the graph was generated to the time the new query was received. For instance, a graph of a social network may be generated at a first time to answer one or more relational data queries. Once the graph is generated, the graph may then be stored within a storage repository to be accessed by later queries on the data. If, at a later time, a query is initiated on the data and the relationship value meets the relationship criteria, the previous graph may be used to answer the query. If, however, the relationship value does not meet the relationship criteria, a new graph may need to be created to respond to the query.

In another occurrence, as an alternative or in addition to using relationship values, a time stamp may be used to define the relationship between the previously generated graph and the new query. This time stamp may be defined by the user making the query, or may be defined by an administrator of the relational database and graphing system. For example, a user may specify that a previous graph may be used so long as the graph was generated from the same relational data set in the last day. Based on the time constraint, a graph redirect module may direct the query to a graph generated in the last day if it is available. However, if a graph is unavailable within the time frame, a new graph may be generated for the relational data query.

Although one graph may be used in some examples, it should also be understood that a plurality of related graphs might be used to respond to relational graph queries. For example, nodes and vertices from a first graph may represent a first half of the data necessary to complete a response to a query, and nodes and vertices from a second graph may represent the second half of the data necessary to complete the response to the query. Thus, based on the similarity between the data required for the current inquiry and data used in previous graphs, an inquiry may be redirected to one or more graphs to respond to the query.

Figure 1:
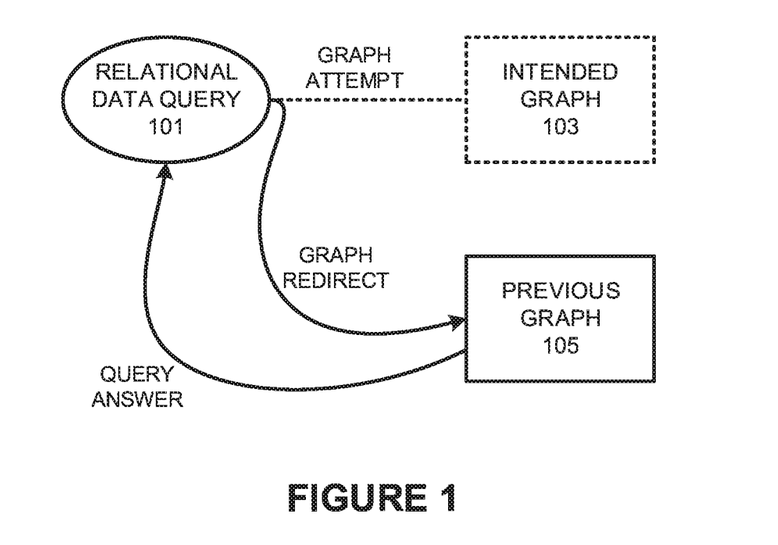
FIG. 1 illustrates an overview of redirecting graph queries.

FIG. 1 illustrates an overview of redirecting graph queries according to one example. FIG. 1 includes relational data query 101, intended graph 103, and previous graph 105. Relational data query 101 may include any query to relational database, including queries by users or queries by automated processes. A relational database is a database that has a collection of tables of data items, all of which is formally described and organized according to the relational model. Typical queries can include a shortest path query to determine the shortest path between one item and another item in the relational database, radius queries to determine the degrees of separation from a particular data item, among other similar inquiries.

As depicted in FIG. 1, when a user or other process queries relational data, the query may attempt to generate a graph, such as intended graph 103, to respond to the query. Thus, once the graph is produced, a response may be generated, which takes time and resources. In the present example, instead of generating intended graph 103, relational data query 101 is redirected to previous graph 105. This redirection can be done based on a variety of factors, including the similarity in the data used in intended graph 103 and previous graph 105, the similarity in the relational data query between the query that generated previous graph 105 and the query that attempts to generate intended graph 103, among other possible redirection factors—including combinations thereof. In some examples, if no previous graph is similar to the inquiry, the intended graph may be generated to respond to the query. In other instances, if no previous graph is similar to the inquiry, a NULL response may be given for the query.

In some instances, rather than using a single graph to respond to the inquiry, a plurality of graphs may be used to respond to the query. For example, if a first graph included a first half of a necessary dataset and a second graph included the second half of the necessary dataset, then both graphs may be used to respond to the query. Accordingly, any number of graphs may be used to complete the dataset and relationships necessary to provide an answer to the query without generating a new graph. Further, time stamps and relationship values may be used to ensure the data of the graphs currently reflects the state of a relational database.

Figure 2:
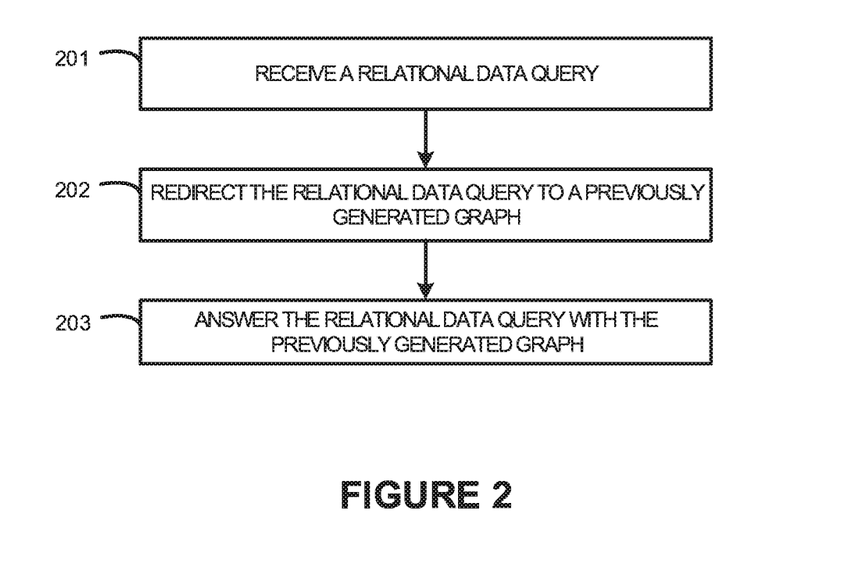
FIG. 2 illustrates a method of redirecting graph queries.

FIG. 2 illustrates a method of redirecting graph queries. The method begins by receiving relational data query (201). This query may include any query that attempts to generate a graph from a relational database, including those by users and automated processes. Following the receipt of the relational data query, the relational data query is redirected to a previously generated graph (202). The previously generated graph is then used to answer or respond to the relational data query (203).

Redirection of the query to a previous graph can be prepared based on a variety of factors, including the similarity in the data used for the attempted graph and previous graph, the similarity in the relational data query between the query that generated the previous graph and the query that attempts to generate intended graph, amongst other possible redirection factors—including combinations thereof. In some examples, previously generated graphs may be identified based on similarity data, such as relationship values assessed to the previously generated graphs. These relationship values may be used to demonstrate the relationship from a previously generated graph to the current state of a relational database, including the number of nodes that have been added or deleted, the number of edges that have been added or deleted, values regarding the subsets of data included within a graph, or any other similar value. Accordingly, a percentage or ratio may be used as the relationship value to demonstrate the changes in the data between the time the previous graph was generated, and the time that the relational data query was initiated.

In other examples, the similarity data may comprise user inputs that are received by a user generating the query, or an administrator in control of the relational system. For instance, a user may grant approval to use any previously generated graph for the data that was generated within a certain period of time, such as the last day. As a result, if a graph for the data exists in the previous day, the previous graph may be used to answer the query. In contrast, if no graph were generated within the previous day, a new graph may be generated to answer the query or the user may be returned a NULL result in response to the query.

In some occurrences, a plurality of graphs may be used to answer the graph query. Thus, if a first graph includes a first subset of the data and relationships necessary for the query and second graph includes a second subset of the data and relationships necessary for the query, then the query may be responded to by traversing both of the graphs. For example, a graph query may require information about customers in the United States and England. Accordingly, graphs designed for North America and Europe may be used to respond to the query, although these graphs were not generated specifically for the United States and Europe. In particular, the redirected query may use subsets of previously generated graphs to respond to the query.

Figure 3:
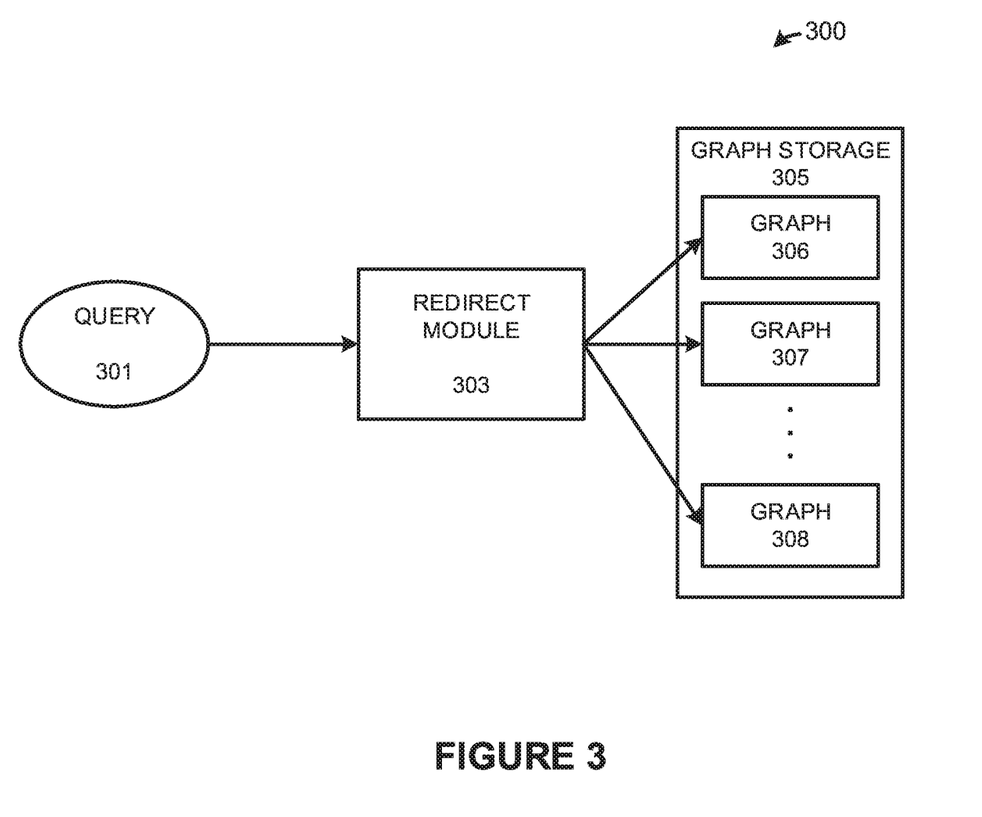
FIG. 3 illustrates a system for redirecting graph queries.

FIG. 3 illustrates a system 300 for redirecting graph queries. System 300 includes query 301, redirect module 303, and graph storage 305. Graph storage 305 includes previously generated graphs 306-308. In operation, a query will be produced either by a user or some other process to make a finding based on relational data. These queries may require a graph the helps illustrate the data for the user and may also be beneficial in traversing data for the inquiry. As illustrated, in system 300, query 301 is received by redirect module 303. Redirect module 303 is used to stop the query from generating an intended graph, and instead allows the query to use an already produced graph or graphs, such as those found in graph storage 305. This redirect to an already produced graph may be based on a variety of factors, including the similarity in the data used for the intended graph and the data used for the previously produced graph, the similarity in the relational data query between the query that generated previously produced graph and query 301 that attempts to generate the intended graph, the amount of time between the generation of the previously generated graph and query 301, amongst other possible redirection factors—including combinations thereof.

Once a graph is identified in graph storage 305, that graph is then used to respond to the original query 301 either with an approximated answer in some examples or a precise answer in others. The approximated answer will be used when the graph is not an ideal match, but an approximated match for the original query, and the exact answer may be returned when the graph is an ideal match for the query. In some cases, if no previous graph is similar to the inquiry, the intended graph may be generated to respond to the query. In other instances, if no previous graph is similar to the inquiry, a NULL answer may be given to the query.

Although not illustrated for simplicity, redirect module 303 may further be connected to a graph engine and a relational database system. The graph engine may allow the redirect module to generate a new graph if the previous graphs 306-308 did not apply to the current query, and the relational database system would allow access to relational data not in graph storage 305.

Figure 4:
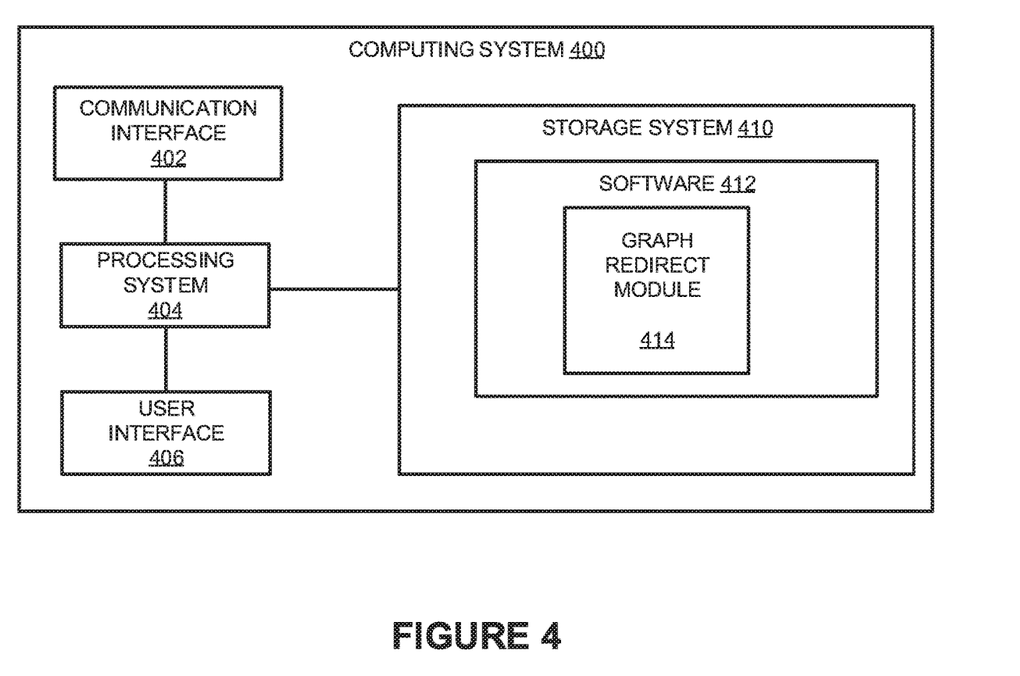
FIG. 4 illustrates a computing system for redirecting graph queries.

FIG. 4 illustrates a computing system 400 for redirecting graph queries. Computing system 400 includes communication interface 402, processing system 404, user interface 406, storage system 410, and software 412. Processing system 404 loads and executes software 412 from storage system 410. Software 412 includes graph redirect module 414. Software 412 may further include an operating system, utilities, drivers, network interfaces, applications, or some other type of software. When executed by computing system 400, software module 414 directs processing system 404 to redirect relational data queries as described herein.

In a particular example, graph redirect module 414 will stop a query from producing a new graph and redirect the query to a previously generated graph. In operation, module 414 will receive a relational data query, redirect the relational data query to a previously generated graph based on similarity data, and respond to the relational data query with the previously generated graph. Although computing system 400 includes one software module in the present example, it should be understood that any number of modules could provide the same operation.

Additionally, computing system 400 includes communication interface 402 that may be configured to communicate with graph storage, a graph engine, one or more relational databases, and receive queries from a relational database. Communication interface 402 may communicate using Internet Protocol (IP), Ethernet, communication signaling, wireless signaling, or any other communication format. Although not illustrated in the present example, it should be understood that the graph storage, the graph engine, and one or more relational databases may be implemented wholly or partially on computing system 400.

Referring still to FIG. 4, processing system 404 may comprise a microprocessor and other circuitry that retrieves and executes software 412 from storage system 410. Processing system 404 may be implemented within a single processing device, but may also be distributed across multiple processing devices or sub-systems that cooperate in executing program instructions. Examples of processing system 404 include general-purpose central processing units, application specific processors, and logic devices, as well as any other type of processing device, combinations of processing devices, or variations thereof.

Storage system 410 may comprise any storage media readable by processing system 404, and capable of storing software 412. Storage system 410 may include volatile and nonvolatile, removable and non-removable media implemented in any method or technology for storage of information, such as computer readable instructions, data structures, program modules, or other data. Storage system 410 may be implemented as a single storage device, but may also be implemented across multiple storage devices or sub-systems. Storage system 410 may comprise additional elements, such as a controller, capable of communicating with processing system 404.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which may be used to store the desired information and that may be accessed by an instruction execution system, as well as any combination or variation thereof, or any other type of storage media. In some implementations, the storage media may be a non-transitory storage media. In some implementations, at least a portion of the storage media may be transitory. It should be understood that in no case is the storage media a propagated signal.

User interface 406 may include a mouse, a keyboard, a camera, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in user interface 406. In some examples, user interface 406 may be omitted.

It should be understood that although computing system 400 is illustrated as a single system for simplicity, the system might comprise one or more computing systems or devices.

Figure 5:
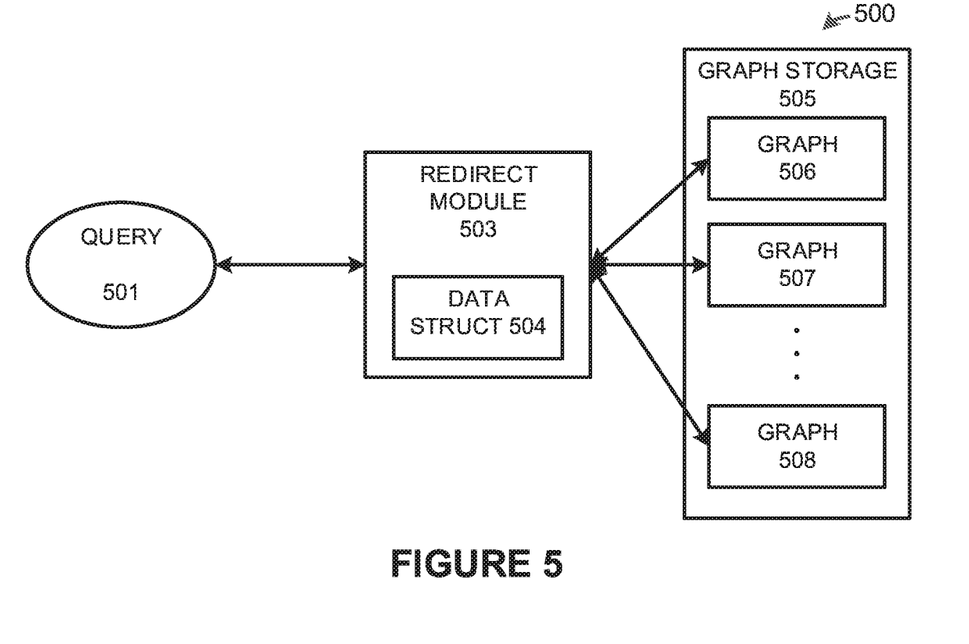
FIG. 5 illustrates an overview of redirecting relational data queries to previously generated graphs.

FIG. 5 illustrates an overview 500 of redirecting relational data queries to previously generated graphs. Overview 500 includes query 501, redirect module 503, and graph storage 505. Redirect module 503 further includes data structure 504, and graph storage 505 further includes graphs 506-508. In operation, a user or automated system generates a query that is received by redirect module 503. Responsive to the request, redirect module 503 is used to identify if a previous graph is available to respond to the query without generating a new graph from the relational database.

As illustrated in the present example, redirect module 503 includes data structure 504. Data structure 504 may comprise a table, a list, a linked list, or any other data structure capable of storing similarity data regarding graphs 506-508. This similarity data may include relationship values for the one or more graphs, time stamps for the one or more graphs in graph storage 505, information about the various subsets of data included within each of the graphs, or any other similarity data to relate the current query to previously generated graphs. In examples where relationship values are used to identify a previously generated graph for a graph query, the relationship values may include a relationship between previously generated graphs and the current state of the relational database. For instance, the relationship value may include a ratio, percentage, or other value to determine the number of changes made to the relational database between the generating the previous graphs and the current query. Based on this ratio, percentage, or other value, redirect module 503 may determine the values for the previously generated graphs meet a certain criteria. In some occurrences, data structure 504 may be periodically updated to determine the number of changes that have been made to the relational data that corresponds to graphs 506-508. However, in other examples, data structure 504 may be generated when a query is made to the previously generated graphs.

Although relationship values may be used in some graphing systems, it should also be understood that time stamps may be used for similarity data in some graphing systems. Accordingly, as graphs are generated in graph storage 505, time stamps may be stored in data structure 504 that correspond to the time when the graph was generated. Once the time stamps are stored, queries may be made to the relational data and identified by redirect module 503. To identify if queries are related to previously generated graphs, the time stamps stored within data structure 504 may be used. In some instances, the user that generates query 501 may specify a time period for which previously generated graphs may be used to respond to the query. For example, if the user specified that a graph generated in the last day for the same data set might be used to answer the query, any graph within graph storage 505 that fulfills the requirement may be used to answer the query. However, if no graph is available, a new graph may be generated to respond to the user request, or a NULL response may be delivered to the user.

Similar to the user query input, in some examples, an administrator may specify the time frame for a previous graph to be used for a query. For instance, an administrator of the relational database system may specify that any graph generated within the last eight hours may be used in an inquiry. Thus, as query 501 is received by redirect module 503, redirect module 503 may use data structure 504 to determine if any graph is available to respond to the query. If a graph meets the time stamp and data set requirement, the older graph may be used rather than generating a new graph for the inquiry. In contrast, if no graph meets the requirements set forth by the administrator, a new graph may be generated to respond to the user query, or NULL response may be delivered to the user.

Further, in addition to or in place of using relationship values and timestamps, data structure 504 may include information about the various subsets of data that are included in graphs 506-508. For example, a graph with graph storage 505 may include information about all customers in North America for a company. Accordingly, if query 501 requested information about customers of Canada, the query may be redirected to the North America graph and the subset of data for Canada may be used in responding to the query.

Figure 6:
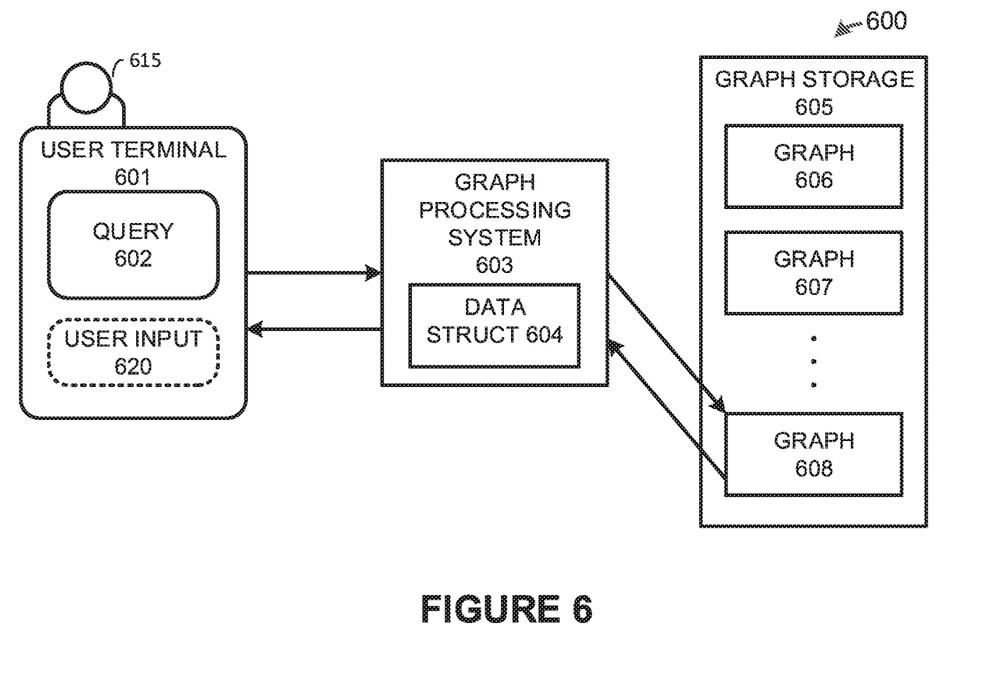
FIG. 6 illustrates an overview of redirecting relational data queries to previously generated graphs.

Referring now to FIG. 6, FIG. 6 illustrates an overview 600 of redirecting graph queries to previously generated graphs. Overview 600 includes user terminal 601, graph processing system 603, and graph storage 605. User terminal 601 is operated by end user 615, and is used to generate query 602 and user input 620. Further, graph processing system 603 is an example of graph redirect module 503 and 303, and comprises any device or system of devices capable of redirecting graph queries to graphs stored within graph storage 605. Graph storage 605 includes graphs 606-608 that are generated using a relational database. Although illustrated with three graphs in the present example, it should be understood that any number of graphs might be stored within graph storage 605.

In operation, users or administrators generate graphs to assist in responding to relational database queries. These graphs take data stored in one or more relational data queries and generate graphs traversable to respond to the various queries associated with the data. Once the graphs are generated, user 615 may generate query 602 using user terminal 601. In response to generating the query, the query is transferred to graph processing system 603. In graph processing 603, data structure 604 is used along with other available modules to determine if a previously generated graph is available to respond to the query. Data structure 604 may be used to manage time stamps, relationship values, dataset identifiers, and any other similar data that relates current queries to previously generated graphs.

In examples where data structure 604 manages time stamps for graphs 606-608, user 615 or an administrator of the graphing system, may be used to specify timing windows for using previously generated graphs. For instance, using user input 620 as an example, user 615 may specify that any graph that uses the same data set and that was generated within the last day may be used to respond to the graph query. Once received by graph processing system 603, data structure 604 may be used to determine the availability of a graph. If a graph is available to response to the query within the time frame specified in user input, the previous graph is used to generate a response. In contrast, if a timestamp for a graph is not available within the timeframe specified, graph processing system 603 may be used to generate a new graph to respond to the query or return a NULL response to the inquiry by user 615.

In other examples, when similarity values are used for the graphs, an administrator or user 615 may be used to specify similarity criteria for the graphs. For instance, user input 620 may specify similarity criteria between the previously generated graphs and the current query 602. The similarity criteria may include ratios or percentages that relate the current status of the relational data to the relational data that was used for the previous graphs. For example, the similarity criteria may include a value for the amount of changes within the relational database since the graph was generated. Accordingly, if enough changes were made since the graph was generated, the graph may no longer be used in responding to the user based query. Instead, graph processing system 603 may generate a new graph for the user query or may respond to the user with a NULL result.

In further instances, dataset information may be maintained for each of the graphs within graph storage 605. Thus, once the query is received, graph processing system 603 may identify which graph within graph storage 605 includes the dataset necessary to respond to the inquiry. This graph, selected by processing system 603, may include the data necessary for query 602, but may also include other data that is not required to respond to query 602. For example, graph 608 may include data for all of the customers for a particular company, but query 602 may only require the customers within North America. Accordingly, using filtering techniques, graph 608 may be used to respond to the query by filtering out the customers that are not in North America.

Figure 7:
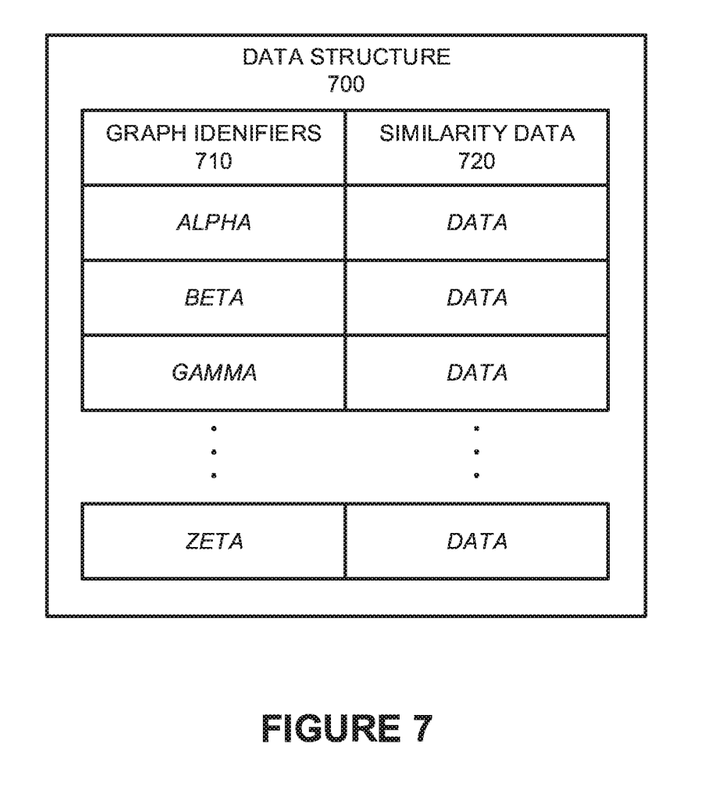
FIG. 7 illustrates a data structure to maintain similarity data for previously generated graphs.

FIG. 7 illustrates a data structure 700 for identifying previously generated graphs to be used in answering relational queries. Data structure 700 includes graph identifiers 710 and similarity data 720. Similarity data 720 may include time stamps for the various previously generated graphs, may include relationship values for determining the changes made in the relational data, may include dataset information for the data used in the previously generated graphs, or may include any other similarity data for identifying previously generated graphs to answer relational queries. Data structure 700 is illustrated in the present example as a table, however, it should be understood that data structure 700 might take a variety of other forms, including a list, tree, or other similar data structure.

In operation, graphs are generated using relational data that is stored in one or more tables. This relational data may include information about social networks, transactions, or any other similar data type. As graphs are generated from the relational data, using nodes and connectors, the graphs are stored within a storage repository to make the graphs available to later relational data queries. In some examples, an administrator or some other automated process generates the graphs prior to receiving a query. However, in other instances, the graphs are generated when queries are received and saved for possible use in later relational data queries.

As the graphs are stored within the storage repository, data structure 700 is maintained to manage the graphs that have previously been generated and to assist in identifying graphs to be used with later queries. As illustrated in FIG. 7, data structure 700 includes graph identifiers 710 and similarity 720, although other data may be stored within data structure 700. Graph identifiers 710 are used to distinguish each of the graphs and may further include information about the relational data sets that were used to create the graph. Similarity data 720 is used to determine the amount of similarity between the current query and the graph that was previously generated. Similarity data 720 may include time stamps for when the graph was generated, values that correspond to the amount that the data has changed since the graph was first generated, dataset information for the type of data used in generating the graph, or any other similarity data.

In instances where time stamps are used, an administrator or user making the query may specify a timing window for which a previous graph may be used. For example, the user may specify along with a query that any graph generated with the same data set in the last week may be used to respond to the query. If a graph exists to respond to the query, then the query will be directed to the appropriate graph and a response will be generated based on the previous graph. However, if a graph has not been generated in the last week using the same data set, then the query may generate a new graph to respond to the user or the user will be provided with a NULL value.

Similar to the operations with time stamps, similarity data 720 may also include relationship values that relate to changes in the data used for the graph. For example, at a first time, a graph may be generated using data from a relational database. Because the data in the database may constantly be subject to changes, such as additions or deletions to the one or more tables, the previously generated graph may no longer properly reflect the current state of the data. Accordingly, the relationship value for each of the graphs may comprise a value related to the number of changes that were made to the data set since the graph was generated, wherein the value may include a percentage, a ratio, or some other type of value. Once a relational data query is received, the value stored within similarity data 720 may be compared to criteria, to determine if a value for a graph meets the criteria. If the value meets the criteria, the graph may be used in responding to the query. However, if none of the graphs in data structure 700 meet the criteria, a new graph may be generated to respond to the query, or a NULL response may be given to the query.

Although described above as consistently monitoring the changes in the relational data tables, it should be understood that the relationship values might be calculated periodically, when a query is made to the system, or at any other time.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a graph redirect system, the method comprising:
    identifying a relational data query associated with a relational database;
    identifying whether at least one previously generated graph in a group of one or more previously generated graphs from the relational database relates to the relational data query based on similarity data, wherein the similarity data relates at least the one or more previously generated graphs to a current state of the relational database, and wherein the at least one previously generated graph was generated prior to the relational data query;
    in response to identifying that at least one previously generated graph relates to the relational data query, directing the relational data query to the at least one previously generated graph; and
    responding to the relational data query using the at least one previously generated graph.

2. The method of claim 1 wherein the similarity data comprises a relationship value assessed to each graph in the group of one or more previously generated graphs.

3. The method of claim 2 wherein identifying whether at least one previously generated graph in the group of one or more previously generated graphs relates to the relational data query based on the similarity data comprises identifying whether at least one relationship value for at least one previously generated graph in the group of one or more previously generated graphs meets at least one relationship criterion.

4. The method of claim 1 wherein the similarity data comprises a time stamp assessed to each graph in the group of one or more previously generated graphs.

5. The method of claim 4 wherein identifying whether at least one previously generated graph in the group of one or more previously generated graphs relates to the relational data query based on the similarity data comprises determining whether at least one time stamp for at least one previously generated graph in the group of one or more previously generated graphs is within a timing window.

6. The method of claim 5 wherein the timing window comprises a window of time specified with the relational data query.

7. The method of claim 5 wherein the timing window comprises a window of time specified by an administrator of the graph redirect system.

8. The method of claim 1 wherein the method further comprises:
in response to identifying that at least one previously generated graph does not relate to the relational data query, generating a new graph for the relational data query.

9. The method of claim 1 wherein the similarity data comprises a relationship value assigned to each of the one or more previously generated graphs, the relationship value determined based on a number of nodes that have been added to each of the one or more previously generated graphs and a number of nodes that have been deleted from each of the one or more previously generated graphs from a time that each of the one or more previously generated graphs was generated and a time that the relational data query was received.

10. The method of claim 1 wherein the similarity data comprises a relationship value assigned to each of the one or more previously generated graphs, the relationship value determined based on a number of edges that have been added to each of the one or more previously generated graphs and a number of edges that have been deleted from each of the one or more previously generated graphs from a time that each of the one or more previously generated graphs was generated, and a time that the relational data query was received.

11. A computer apparatus to redirect graph queries, the computer apparatus comprising:
one or more non-transitory computer readable media;
a processing system coupled to the one or more non-transitory computer readable media; and
processing instructions stored on the one or more non-transitory computer readable media that, when read and executed by the processing system, direct the processing system to:
identify a relational data query;
identify whether at least one previously generated graph in a group of one or more previously generated graphs from a relational database relates to the relational data query based on similarity data, wherein the similarity data relates at least the one or more previously generated graphs to a current state of the relational database, and wherein the at least one previously generated graph was generated prior to the relational data query;
in response to identifying that at least one previously generated graph relates to the relational data query, direct the relational data query to the at least one previously generated graph; and
respond to the relational data query via the at least one previously generated graph.

12. The computer apparatus of claim 11 wherein the similarity data comprises a relationship value assessed to each graph in the group of one or more previously generated graphs.

13. The computer apparatus of claim 12 wherein the processing instructions to identify whether at least one previously generated graph in the group of one or more previously generated graphs relates to the relational data query based on the similarity data direct the processing system to identify whether at least one relationship value for at least one previously generated graph in the group of one or more previously generated graphs meets at least one relationship criterion.

14. The computer apparatus of claim 11 wherein the similarity data comprises a time stamp assessed to each graph in the group of one or more previously generated graphs.

15. The computer apparatus of claim 14 wherein the processing instructions to identify whether at least one previously generated graph in the group of one or more previously generated graphs relates to the relational data query based on the similarity data direct the processing system to determine whether at least one time stamp for at least one previously generated graph in the group of one or more previously generated graphs is within a timing window.

16. The computer apparatus of claim 15 wherein the timing window comprises a window of time specified with the relational data query.

17. The computer apparatus of claim 15 wherein the timing window comprises a window of time specified by an administrator.

18. The computer apparatus of claim 11 wherein the processing instructions further direct the processing system to:
in response to identifying that at least one previously generated graph does not relate to the relational data query, generate a new graph for the relational data query.

19. The computer apparatus of claim 11 wherein the similarity data comprises a relationship value assigned to each of the one or more previously generated graphs, the relationship value determined based on a number of nodes and/or edges that have been added to each of the one or more previously generated graphs and a number of nodes and/or edges that have been deleted from each of the one or more previously generated graphs from a time that each of the one or more previously generated graphs was generated, and a time that the relational data query was received.

20. An apparatus to manage queries, the computer apparatus comprising:
one or more non-transitory computer readable media;
processing instructions stored on the one or more non-transitory computer readable media that, when read and executed by a processing system, direct the processing system to:
in response to a relational data query, identify whether at least one previously generated graph in a group of one or more previously generated graphs relates to the relational data query based on similarity data, wherein the similarity data relates at least the one or more previously generated graphs to a current state of data associated with the relational data query, and wherein the at least one previously generated graph was generated prior to the relational data query;
in response to identifying that at least one previously generated graph relates to the relational data query, direct the relational data query to the at least one previously generated graph; and respond to the relational data query via the at least one previously generated graph.

\* \* \* \* \*